(12) United States Patent
Liu

(10) Patent No.: US 9,129,721 B2
(45) Date of Patent: Sep. 8, 2015

(54) DIRECT CURRENT (DC) TRANSMISSION SYSTEM COMPRISING A THICKNESS CONTROLLED LAMINATED INSULATION LAYER AND METHOD OF MANUFACTURING

(71) Applicant: Rongsheng Liu, Vasteras (SE)

(72) Inventor: Rongsheng Liu, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 14/282,430

(22) Filed: May 20, 2014

(65) Prior Publication Data

US 2014/0251654 A1 Sep. 11, 2014

Related U.S. Application Data

(63) Continuation of application No. PCT/EP2011/071034, filed on Nov. 25, 2011.

(51) Int. Cl.
*H01B 7/00* (2006.01)
*H01B 7/02* (2006.01)
*H01B 9/00* (2006.01)
*H01B 11/00* (2006.01)
(Continued)

(52) U.S. Cl.
CPC .............. *H01B 7/02* (2013.01); *H01B 9/0688* (2013.01); *H02G 15/103* (2013.01); *H01B 7/0208* (2013.01)

(58) Field of Classification Search
CPC ....... H01B 7/02; H01B 7/0208; H01B 7/0225
USPC ..... 174/25 R, 120 FP, 121 R, 121 SR, 120 C,
174/120 SC
See application file for complete search history.

(56) References Cited

U.S. PATENT DOCUMENTS 3,773,965 A * 11/1973 Reynolds ..................... 174/25 G
3,814,622 A * 6/1974 Setsuya ......................... 428/361
(Continued)

FOREIGN PATENT DOCUMENTS

EP 0875907 B1 11/1998
GB 1458422 A 12/1976
(Continued)

OTHER PUBLICATIONS

Machine Translation of Iinuma (JP H10283852) provided with Office Action.*

(Continued)

*Primary Examiner* — Chau N Nguyen
*Assistant Examiner* — Roshn Varghese
(74) *Attorney, Agent, or Firm* — Whitmyer IP Group LLC

(57) ABSTRACT

A direct current transmission system and a method for preparation including an electrical conductor layer, an inner semi-conductive layer covering the conductor layer, an insulation layer provided on the semi-conductive layer including laminated polymer material and impregnated with a high viscosity fluid, and including an inner part, a middle part, an outer part, and an outer semi-conductive layer covering the insulation layer. The inner part has a first thickness, the middle part has a second thickness and the outer part has a third thickness, whereby the second thickness is greater than the first thickness and greater than the third thickness. The laminated polymer material within each part has a constant thickness and constant ratio of polymer to laminated material and wherein at least one of the parts has a thickness ratio of less than 35%.

16 Claims, 1 Drawing Sheet

(51) Int. Cl.
*H01B 9/06* (2006.01)
*H02G 15/103* (2006.01)

(56) References Cited

U.S. PATENT DOCUMENTS

| | | | | |
|---|---|---|---|---|
| 3,951,712 | A * | 4/1976 | Nakata | 174/84 R |
| 3,987,239 | A | 10/1976 | Chen et al. | |
| 4,075,421 | A | 2/1978 | McCullough | |
| 4,237,334 | A * | 12/1980 | Kojima et al. | 174/25 R |
| 4,360,706 | A * | 11/1982 | Lanfranconi et al. | 174/105 SC |
| 4,361,723 | A * | 11/1982 | Hvizd et al. | 174/102 SC |
| 4,675,470 | A * | 6/1987 | Hata et al. | 174/25 R |
| 4,853,490 | A * | 8/1989 | Bosisio | 174/25 R |
| 6,207,261 | B1 | 3/2001 | Kuwabara et al. | |
| 6,383,634 | B1 | 5/2002 | Kornfeldt et al. | |
| 6,399,878 | B2 | 6/2002 | Kondo et al. | |
| 7,943,852 | B2 | 5/2011 | Hirose | |
| 2002/0039654 | A1 * | 4/2002 | Gustafsson et al. | 428/375 |

FOREIGN PATENT DOCUMENTS

| | | |
|---|---|---|
| JP | H10283852 A | 10/1998 |
| WO | 2011073709 A1 | 6/2011 |

OTHER PUBLICATIONS

Hampton R., "Feature article—Some of the considerations for materials operating under high-voltage, direct- current stresses" Jan./Feb. 2008, pp. 5-13.

International Preliminary Report on Patentability Application No. PCT/EP2011/071034 Completed: Sep. 3, 2013 21 pages.

International Search Report and Written Opinion of the International Searching Authority Application No. PCT/EP2011/071034 Completed: Aug. 1, 2012; Mailing Date: Aug. 7, 2012 10 pages.

Hata, "Solid DC Submarine Cable Insulated with Polypropylene Laminated Paper (PPLP)" SEI Technical • Review No. 62 • Jun. 2006; pp. 3-9.

* cited by examiner

DIRECT CURRENT (DC) TRANSMISSION SYSTEM COMPRISING A THICKNESS CONTROLLED LAMINATED INSULATION LAYER AND METHOD OF MANUFACTURING

FIELD OF THE INVENTION

The present invention refers to a direct current (DC) transmission system and a method for preparing said system.

BACKGROUND OF THE INVENTION

Insulation for direct current (DC) transmission systems is important for the reliability of a transmission system. The reliability depends on the material used for covering the conductor layers. The geometry of the insulation material around the transmission system is also important.

The amount of power that can be delivered by a DC cable has increased dramatically in the past decades. Further increasing the amount of power that can be delivered by a DC cable can be achieved in several ways as described by Nordberg et al., Cigre, Session 2000, 21-302. Examples mentioned are increasing the size of the conductor or alternatively increasing the voltage. The latter has the benefit of lower power losses but necessitates an increase in the thickness of the insulation in general. This will increase the cables' size and weight. An alternative solution is to increase the maximum allowed conductor temperature or to increase the dielectric strength of the insulation material.

New insulation liquids have been developed, such as gelling liquids described in U.S. Pat. No. 6,383,634, to allow an increase in conductor temperature.

Laminated insulation materials have been developed to increase the dielectric strength of the insulation material. As explained by Hampton R., IEEE Electrical Insulation Magazine, Vol 24, No 1, 2008, page 5, important parameters for the provision of a reliable DC insulation material are electrical resistivity at a range of stresses and temperatures, DC breakdown performance, sensitivity to electrical aging and space charge development. Resistivity is dependent on DC stresses and temperatures as well as on the thickness of the insulation material, whereby the resistivity decreases with increased stress and temperature. Electrical charges that become trapped within the insulation material (space charge) will also have an effect on the electrical stress performance of the material. The breakdown strength may decrease with time of applied DC stress due to such space charges. The geometry of a transmission system such as a cable, cable joints, buses and the like, and the distribution of the temperature are further critical factors for the reliability of the DC transmission system. Hampton also explains the advantage of a homogenous insulation layer and mentions that a laminated insulation system may be a source for inhomogeneity, which in turn may affect the quality of the insulation material. Leakage of current should preferably be prevented. If leakage becomes too high, dielectric heating may occur. This condition may result in melting.

JP 10 283852 describes an insulation material for use in a direct current high viscosity oil impregnated power cable, whereby the insulation material comprises multilayer of paper and laminated paper sheets.

WO2011/073709 describes a high voltage direct current (HVDC) cable comprising an insulation layer of laminated polypropylene (PP)/Kraft paper. The insulation layer has a constant thickness over the entire insulation layer. The invention relates to delamination of the insulation layer during impregnation with an impregnation fluid having a medium viscosity of at least 1000 cSt at 60° C. and an air impermeability of at least 100000 Gurley sec$^{-1}$. This problem is solved by using special paper in the insulation laminate.

U.S. Pat. No. 7,943,852 describes a superconducting cable that can be used in both DC and alternating current (AC) cables. The cables are housed in a heat-insulated pipe filled with a coolant. The resistivity of the laminated polymer (PP)/paper insulation material can be varied by varying the density, or by adding dicyandiamide to the paper, or by varying the thickness ratio of polymer to paper in the laminate. The insulation layer has a low resistivity on the inner part close to the conductor layer and a higher resistivity at increasing radial distance from the conductor layer. In the examples, Kraft paper is positioned around the conductor, while laminated polymer/paper is used as insulation material in the rest of the insulation layer. This laminated insulation layer comprises material having an increasing resistivity at increased radial distance so that the cable also has excellent AC electrical properties.

U.S. Pat. No. 6,399,878 describes insulation material for DC cables that may comprise three different parts, whereby the inner and outer part closest to the semiconductive layers contain paper that has a low resistivity. The middle insulation part comprises laminated polymer/paper material having higher resistivity. This layer may be divided in different parts, whereby the different parts have different polymer/paper ratios and whereby the ratios decrease at increasing radial distance from the inner conductor layer. (FIGS. 8a, 8b, 13 and 14) The resistivity in the middle layer thus decreases at increasing radial distance. The insulation material is impregnated with a medium viscosity oil having a viscosity from 10 centistokes and less than 500 centistokes (cSt) at 60° C.

U.S. Pat. No. 6,207,261 describes a laminated polymer/paper insulation material for DC cables, which is impregnated with a medium viscosity fluid. The thickness of the laminate may be varied by varying the thickness of the paper or the polymer. Nothing is mentioned about variation of thickness of the laminated material within one cable. After lamination, the laminate is being calendered or supercalendered. The paper in the laminate has one smooth and one rough surface.

EP 875907 describes insulation material comprising paper at the inner and outer part of the insulation layer, which paper material has low resistivity. The middle part comprises laminated polymer/paper material having higher resistivity. The thickness of the paper may be varied to change the resistivity. The aim of the invention is to provide insulation material having a resistivity between 0.1 $\rho_0$ and 0.7 $\rho_0$, where $\rho_0$ is the resistivity of the normal Kraft paper, over the whole temperature range. This may be achieved by varying the quality of the materials, or using additives such as amine or cyanoethylpaper.

Hata R. SEI Technical review, 62, June 2006, page 3, describes solid DC submarine cable insulated with polypropylene (PP) laminated paper, whereby the inner part of the insulation layer in the vicinity of the conductor layer comprises paper, which is covered by a layer of laminated PP forming the middle part of the insulation material, which is subsequently covered with paper which forms the outer part of the insulation layer.

U.S. Pat. No. 3,987,239 describes insulation material, whereby the electrical stress distribution in a high voltage system is improved by providing insulation material comprising different parts located at different radial distances from the conductor layer. The different parts may comprise the same or different insulation material. The effect of the arrangement of layers is that the resistivity gradient in the insulation material from the inner part to the outer part of the insulation layer is as flat as possible. FIG. 9 in U.S. Pat. No. 3,987,239 shows that the resistivity is flat at the inner part of the insulation layer and then decreases at increasing radial distance from the conductor layer. The plastic material used has an E-stress below 22 kV/m. Modern insulation materials have an E-stress above this value.

U.S. Pat. No. 4,075,421 describes insulation paper, whereby the resistivity in the most inner part is higher compared to the resistivity in the outer part of the insulation layer.

A limiting factor in the development of DC transmission systems, especially cable joints and cable terminations, is the insulation breakdown strength. Experiments have shown that the breakdown location in a cable is often started from the semiconductive layer/insulation layer interface.

There is a need for insulation material, whereby the resistivity is lowered at locations close to the inner and outer semiconducting layers. There is a need for an improved resistivity control in the insulation material, especially at these locations. By improving the electrical field stress distribution, the breakdown stress of the insulation material can be improved.

Although many improvements have been made to laminated insulation materials for DC transmission systems, there is still a need for improving the electrical performance, increase the transmission capacity, improve the reliability, decrease aging and manufacturing costs for insulated transmission systems. With regard to high and ultra high voltage (UHV) DC and (U)HVDC for mass-impregnated non-draining (MIND) transmission systems there is a need for improved resistivity control over the entire insulation layer, especially with regards to insulation materials impregnated with high viscosity fluids.

SUMMARY OF THE INVENTION

One object of the invention is to provide a DC transmission system with improved resistivity control in the insulation material. It is also an object to provide a DC transmission system with improved electrical field stress distribution. Another object is to provide a DC transmission system with excellent electrical performance and increased transmission capacity. The DC transmission system preferably has a decreased resistivity at the semiconductive layer/insulation layer interface. It is also an object to provide a DC transmission system, which is reliable. Another object is to provide a DC transmission system, which is less sensitive to aging. It is a further object to provide a DC transmission system, which can be adapted and used for different transmission systems under different working conditions. It is also an object to provide a DC transmission system, which can be manufactured at low cost. The above mentioned objects are preferably achieved in a high or ultra high voltage direct current ((U) HVDC) system for mass-impregnated non-draining transmission system (MIND). Said systems should preferably be impregnatable with a fluid that has a high viscosity at working temperatures below 65 or 80° C. and a low viscosity at processing temperatures of 100° C. or more.

The objects are achieved by the DC transmission system, which is characterized in that the inner part has a first thickness, the middle part has a second thickness and the outer part has a third thickness, whereby the second thickness is greater than the first thickness and greater than the third thickness, and wherein the laminated polymer material within each one of the parts has a constant thickness and constant thickness ratio of polymer to laminated material, and wherein at least one of the parts has a thickness ratio of less than 35%.

The breakdown strength depends, among other things, on the thickness of the material. Thinner material normally has a higher breakdown strength. By arranging the thinner layer of the insulation material close to the inner and outer semiconductive layers, the breakdown strength will be high at locations where it is most likely to break down. The overall dielectric properties of the insulation system are therefore improved. The risk of breakdown of the transmission system decreases. The new transmission system is thus more reliable and will last longer than the transmission systems used today. The new arrangement of insulation material is especially useful for (U)HVDC-MIND transmission systems impregnated with a high viscosity fluid.

In one embodiment, the first thickness of the inner part is substantially between 2 to 20% of the total thickness of the insulation layer, the second thickness of the middle part is substantially between 10 to 96% of the total thickness of the insulation layer, and the third thickness of the outer part is substantially between 2 to 20% of the total thickness of the insulation layer.

In another embodiment, the total thickness of the insulation layer is between 0.5 and 50 mm. In a further embodiment, the middle part comprises laminated polymer material, wherein the thickness ratio of polymer to laminated material is more than 35%.

The inventor has found that the electric field stress in a DC transmission system can be reduced at the semiconductive layer/insulation layer interface(s) by introducing thickness controlled laminated plastic or rubber films as the insulation material. The thickness arrangement of the laminated insulation material according to the invention provides for insulation material in the inner and the outer part with lower values of volume resistivity and higher breakdown strength compared to the laminated insulation material in the middle part. Instead of creating a flat resistivity gradient over the insulation material or a part thereof, the new arrangement of insulation material has reduced resistivity-governed E-stresses close to the semiconductive layer/insulation layer interfaces, while the resistivity-governed E-stresses are higher in the middle part of the insulation material.

One effect of this new arrangement is a decrease in breakdown, especially at the semiconductive layer/insulation layer interfaces. This increases the reliability of the DC transmission system. It is expected that the new insulation material is less sensitive to space charges or aging.

Further, the use of laminated insulation materials in the inner and outer parts improves the control of the resistivity over the insulation layer. It also improves the flexibility to adapt and use the insulation material for different transmission systems under different working conditions.

In a further embodiment, the DC transmission system is selected from a cable, a cable joint, bushings, insulated buses, bus bars and cable terminations. The new insulation material is less susceptible to breakdown and thus especially suited to be used in cable joints and cable terminations.

The breakdown strength also depends on the material used in the insulation layer. Different transmission systems may have different requirements for the material. For example, the breakdown strength for polyethylene or polypropylene is higher than 200 kV/mm at a thickness of 100 μm, while the breakdown strength for cross-linked polyethylene can be below 65 kV/mm at a thickness of 9 mm.

In one embodiment, the laminated insulation material comprises a plastic material laminated with a paper. In another embodiment, the plastic material is selected from polyolefins selected from polyethylene, low density polyethylene, which is linear or not, medium density polyethylene, high density polyethylene, cross-linked polyethylene, and polypropylene, polyvinyl chloride, polyester, aramid and polyimide, or mixtures thereof. In an alternative embodiment, the plastic material is high density polyethylene.

In one embodiment, the laminated insulation material comprises a rubber material laminated with a paper. In one embodiment, the rubber material is selected from silicone rubber, ethylene propylene diene monomer rubber and ethylene propylene rubber, or mixtures thereof.

Preferably, the insulation material comprises paper that has been calendered before lamination with the plastic or rubber material. The laminated paper may be smooth on both surfaces.

In another embodiment, the transmission system is impregnated with a gas or a liquid. Preferably, the fluid is not a medium viscosity fluid.

In an alternative embodiment, the density of the laminated insulation material in the inner part and the outer part is higher compared to the density of the laminated insulation material in the middle part. Breakdown strength is improved by increasing the density of the laminated insulation material. This density arrangement will thus further improve the reliability of the transmission system and prevent space charging and aging.

The object is also achieved by a method for preparing the transmission system, which is characterized by comprising a first step of providing the conductor layer, circumferentially covered by the semiconductive layer, a second step of laminating a plastic or rubber material of the inner part, the middle part and the outer part with paper, a third step of winding the obtained laminated material on the inner semiconductive layer, whereby firstly the inner part, secondly the middle part and thirdly the outer part is wound on the inner semiconductive layer, wherein the inner part has a first thickness, the middle part has a second thickness and the outer part has a third thickness, whereby the second thickness is greater than the first thickness and greater than the third thickness, and wherein the laminated polymer material within each one of the parts has a constant thickness and constant thickness ratio of polymer to laminated material, and wherein at least one of the parts has a thickness ratio of less than 35%, and optionally a fourth step of removing gases from the obtained product, followed by an optional fifth step of cross-linking the insulation material, and a final step of circumferentially covering the insulation layer with the outer semiconductive layer.

In one embodiment, the method comprises a further step of impregnating the insulation material with a gas or a liquid, which is solid below 80° C.

In another embodiment, the liquid is selected from a mineral oil and/or an ester fluid, and the gas is selected from sulfur hexafluoride, compressed air and/or nitrogen.

The new transmission system is easier to prepare. The manufacturing costs are lower.

BRIEF DESCRIPTION OF THE DRAWINGS

The invention will now be explained more closely by means of a description of various embodiments and with reference to the drawings attached hereto.

DETAILED DESCRIPTION OF THE INVENTION

Figure 1:
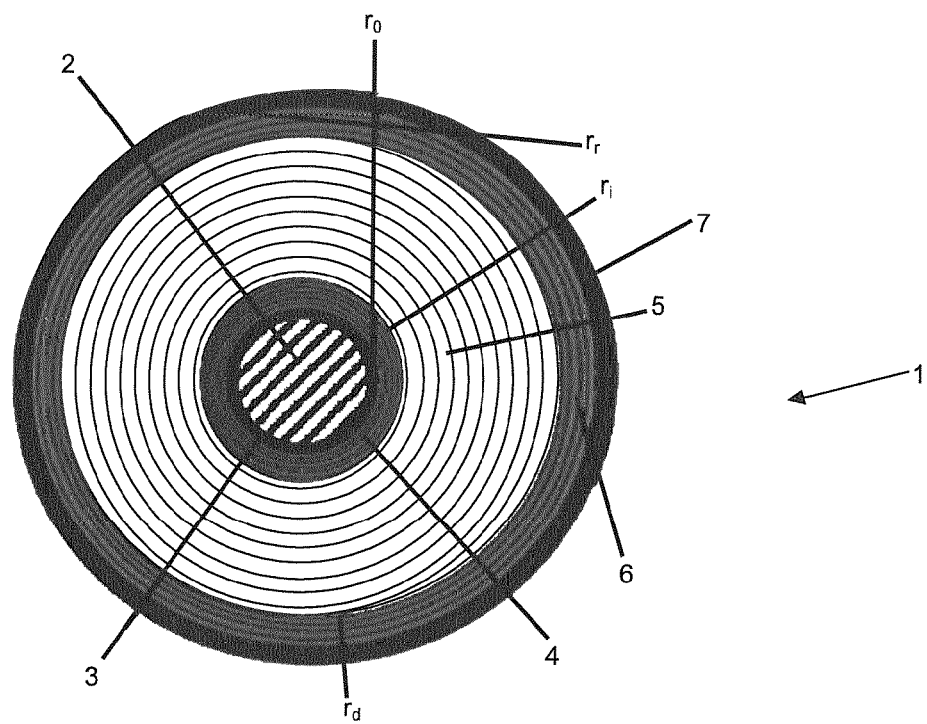
FIG. 1 shows a schematic view of a DC transmission system as a power cable.
Figure 2:
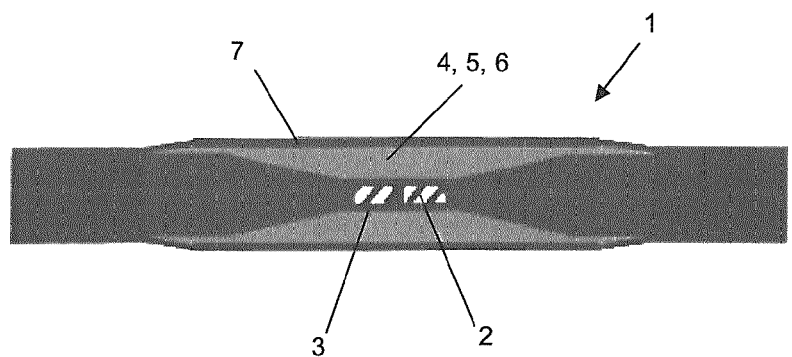
FIG. 2 shows a schematic view of a cable joint insulated with the new insulation material.

FIG. 1 shows a direct current (DC) transmission system 1 as a power cable. Other transmission systemcomponents may be a cable joint as shown in FIG. 2. The transmission systems 1 or systemcomponents 1 may also be bushings, insulated buses, bus bars and cable terminations. One embodiment relates to cable terminations. Further transmission systems or systemcomponents 1 may be any electrical DC device that has insulation. The invention also relates to solid DC transmission systems. Another embodiment relates to high and ultra high voltage DC ((U)HVDC) transmission systems, preferably (U)HVDC systems or systemcomponents for mass-impregnated non-draining (MIND) transmission systems or systemcomponents 1.

As shown in FIG. 1, a conductor layer 2 is circumferentially covered by an inner semiconductive layer 3. An insulation layer is provided on the outer circumference of the semiconductive layer 3. The insulation layer comprises parts of insulation material and can be divided by an inner part 4, a middle part 5 and an outer part 6. The inner part 4 is located in the vicinity of the semiconductive layer 3 from a first radial distance $r_0$ at a semiconductive layer 3/insulation layer interface. The inner part 4 is circumferentially covered by a middle part 5 from an initial radial distance $r_i$ to a maximum radial distance $r_d$ of the middle part 5. The middle part 5 is circumferentially covered by an outer part 6 from the maximum radial distance $r_d$ to the outer radial distance $r_r$. An outer semiconductive layer 7 is provided on the outer circumference of the insulation layer and provides an insulation layer/semiconductive layer 7 interface.

The outer semiconductive layer 7 may be covered by a sheath of lead or metal. This sheath may be further covered by a protection layer that may also have insulation and mechanical properties such as a plastic or rubber material (not shown).

The inner, middle and outer part 4, 5, 6 of the insulation material may comprise sub-parts. The insulation material is laminated material and may comprise a flat film or sheet of polymer material laminated with paper. The polymer material may be plastic material or rubber material. The term "laminated material", "laminated sheet" and "laminated polymer material" refer to a sheet comprising polymer and paper.

The paper used may differ and any paper used in the art may be suitable. For example, cellulose paper may be used. In one embodiment, Kraft paper is used. This Kraft paper may have different resistivities in or within the different parts 4, 5, 6 of the insulation layer. The paper may be calendered before being laminated. Normally, the paper had two smooth surfaces, but the invention is not limited to this. The paper may have one smooth and one rough surface.

The plastic and rubber material may be any material used in the art, which has insulation properties. The material used may be different depending on the application of the transmission system, e.g. low voltage, medium voltage or high voltage systems. Examples of plastic materials, but not limited thereto, may be one of polyolefins such as polyethylene, which may be low density polyethylene (linear or not), medium density polyethylene, high density polyethylene, cross-linked polyethylene, or polypropylene and polybutylene. In one embodiment polyethylene is used. In another embodiment high density polyethylene is used. Other plastic materials may be polyvinyl chloride, polyesters, aramid or polyimide. Alternatively, mixtures of plastic materials may be used.

Examples of rubber materials, but not limited thereto, may be one of silicone rubber, ethylene propylene diene monomer rubber and ethylene propylene rubber. Alternatively, mixtures of rubber materials may be used.

The insulation material of the present invention may comprise one or more than one insulation material. The material used may be one or mixtures of plastic material or one or mixtures of rubber material. The material used may also be a mixture of plastic and rubber materials. Alternatively, different materials may be used in different parts 4, 5, 6 of the insulation material. Both mixtures of materials and different materials in different parts 4, 5, 6 may be used. Although the resistivity-governed E-stresses differ in the inner part 4 and outer part 6 compared to the middle part 5, the electrical resistivity of the film of the laminated material may be the same or different in the different parts 4, 5, 6 of the insulation material.

The materials or mixture of materials in the three parts 4, 5, 6 may have different densities such that the resistivity-governed E-stresses in the inner 4 and outer part 6 of the insulation material are lower compared with the resistivity-governed E-stresses in the middle part 5 of the insulation material. The density of the laminated insulation material in the inner part 4 and the outer part 6 may be higher compared to the density of the laminated insulation material in the middle part 5. The different densities may be provided by using paper and/or plastic or rubber material having different densities.

The resistivity $\rho$ in the middle part 5 of the insulation material may be more than $10^{14}$ $\Omega \cdot m$, or more than $10^{10}$ $\Omega \cdot m$ and the resistivity $\rho$ in the inner part 4 and outer part 6 of the insulation material is less than $10^{14}$ $\Omega \cdot m$ or less than $10^{10}$ $\Omega \cdot m$.

Preferably, the transmission system 1 is able to deliver voltages in an amount of over 500 kV, preferably at and/or over 800 kV. The E-stress of the insulation material is preferably above 22 kV/m.

The insulation layer is arranged at the semiconductive layer 3/insulation layer interface at radial distance $r_0$ such that the material is relatively thin in the vicinity of the semiconductive layer 3. Because different transmission systems 1 may be used for different applications, the different systems may have different requirements regarding insulation materials. Therefore, the given thickness and given differences in thickness may vary depending on the transmission system or components 1 (e.g. cable or cable joint), the application for the system, the material used, etc.

The insulation material of the inner part 4 at radial distance $r_0$ may be a laminated sheet having a first thickness between 0.1 and 500 μm, or 1 and 200 μm, or 20 and 150 μm. The thickness of the inner part 4 may be between 1 to 20%, or 5 to 15%, preferably about 10% of the total thickness of the insulation layer. The thickness ratio of polymer to laminated material (polymer and paper) in the laminated sheet in the inner part 4 may be between 1 to 50%, preferably below 35%, or below 30%. For the sake of clarity, "a ratio of 30%" means that 30% of the laminated material contains the polymer.

The insulation material of the middle part 5 between radial distances $r_i$ and $r_d$ may be a laminated sheet having a second thickness between 1 and 1000 μm, or 25 and 500 μm, or 50 and 200 μm. The thickness of the middle part 5 may be between 10 to 95%, or 15 to 85%, preferably about 80% of the total thickness of the insulation layer. The thickness ratio of polymer to laminated material in the laminated sheet in the middle part 5 may be between 2 to 99%, or 50 to 90%, preferably more than 35%, or 40%, or 50%.

The insulation material of the outer part 6 between a radial distance $r_d$ to $r_r$ may be a laminated sheet having a third thickness between 0.1 and 500 μm, or 1 and 200 μm, or 20 and 150 μm. The thickness of the outer part 6 may be between 1 to 20%, or 5 to 15%, preferably about 10% of the total thickness of the insulation layer. The thickness ratio of polymer to laminated material in the laminated sheet in the outer part 6 may be between 1 to 50%, preferably below 35%, or below 30%.

The thickness of the different parts 4, 5, 6 is preferably varied by varying the ratio of polymer to paper in the laminated sheets. The thickness of the paper or the thickness of the plastic or rubber material may be varied. Preferably, only the thickness of the plastic or rubber material in the laminated sheet is varied.

The thickness of the laminated material does not vary within each part 4, 5, 6 or at least the thickness does not vary within each sub-part within each part 4, 5, 6. In other words, in each part or sub-part, the thickness of the laminated sheet is constant. Also, the ratio of polymer to laminated material does not vary within the parts 4, 5, 6, or sub-parts thereof. In other words, in each part or sub-part, the ratio of polymer to laminated material is constant. The thickness and the ratio may only be different between the parts 4, 5, 6, or between the sub-parts thereof. In one embodiment, the inner part 4 and the outer part 6 comprise laminated material having the same thickness and/or the same ratio of polymer to laminated material. The thickness and/or the ratio of the laminated material in the middle part 5 is preferably greater than the thickness and/or the ratio of the laminated material in the inner part 4 and the outer part 6.

For example, the inner and outer part 4, 6 may comprise of laminated material having a thickness of 1 to 10% of the total thickness of the insulation layer and a thickness ratio of polymer to laminated material between 5 and 25%, while the middle part 5 may comprise of laminated material having a thickness of 40 to 85% of the total thickness of the insulation layer and a thickness ratio of polymer to laminated material between 40 and 85%. The intervals mentioned in this example may be replaced by any values mentioned above or any value falling within the intervals mentioned above.

In one embodiment, only the middle part 5 may comprise one or more sub-parts having different resistivities. These different sub-parts can be used to further improve the resistivity control in the insulation layer. The sub-parts may for example have different ratios of plastic material or rubber/paper. The sub-parts together form the second thickness. The thickness and the ratio within each sub-part are constant and do not vary within the sub-parts.

In another embodiment, also the inner part 4 and the outer part 6 may comprise one or more sub-parts having different resistivities, whereby the thickness and the ratio within each sub-part is constant and does not vary within the sub-parts.

The insulation material may be impregnated with a liquid or a gas. Liquids may be any liquids used in the art such as mineral oils and/or ester fluids. Gases may be selected from sulfur hexafluoride, compressed air and/or nitrogen.

The insulation material is impregnated with a high viscosity fluid, which is solid at working temperatures below 65° C., preferably below 80° C. The viscosity of the fluid is at least more than 501, or 1000, or 5000, 10,000 centistokes (cSt) at 65° C., or at 80° C. For processability, the fluid may have a low viscosity above 100° C. or above 110° C.

A suitable insulating fluid is T2015 (H&R ChemPharm Ltd. (UK), which is based on mineral oil with about 2% by weight of a high molecular weight polyisobutene as viscosity increasing agent. T2015 has a viscosity at 100° C. of about 1200 cst. Other examples of suitable insulating fluids are gelling compositions such as those disclosed in U.S. Pat. No. 6,383,634, which is hereby incorporated by reference. These gelling compositions may comprise an oil and a gelator and have a thermo-reversible liquid-gel transition at a transition temperature $T_t$, wherein the gelling composition at temperatures below $T_t$ has a first viscosity and at temperatures above $T_t$ a second viscosity, which is less than the first viscosity. The composition comprises molecules of a polymer compound having a polar segment capable of forming hydrogen bonds together with fine dielectric particles having a particle size of less than 1000 nm. Further details concerning the composition are provided in claims 1 to 31 of said patent.

The present invention also relates to a method for preparing the transmission system described above. In one embodiment, the method comprises a first step of providing the conductor layer 2, which is circumferentially covered by the semiconductive layer 3. In a second step, the plastic or rubber material of the inner part 4, the middle part 5 and the outer part 6 is laminated with paper. The paper may have been calendered before and not after being laminated. In a third step, the obtained laminated material is wound on the inner semiconductive layer 3, whereby firstly the inner part 4, secondly the middle part 5 and thirdly the outer part 6 is wound on the inner semiconductive layer 3. Alternatively, the laminated layer comprising the three parts 4, 5, 6 is first prepared as one piece and subsequently wound on the semiconductive layer 3. Optionally, gases are removed from the obtained product in a fourth step. This step is optionally followed by a fifth step, whereby the insulation material is cross-linked. In a final step the insulation layer is circumferentially covered with the outer semiconductive layer 7 and sheath.

An additional step may be the impregnation of the insulation material with a liquid or a gas, preferably a high viscosity fluid, which is solid below 65° C., preferably below 80° C. and has a low viscosity at working temperatures of 100° C., or 110° C.

The term "conductor layer" as used herein, means a conductor as well as a conductive layer and superconductive layer.

The present invention is not limited to the embodiments disclosed but may be varied and modified within the scope of the following claims.

What is claimed is:

1. A direct current transmission system comprising
    an electrical conductor layer,
    an inner semiconductive layer circumferentially covering the conductor layer,
    an insulation layer provided on the outer circumference of the semiconductive layer comprising laminated polymer material having a total thickness and impregnated with a high viscosity fluid, which is solid below 65° C., and comprising
        an inner part in the vicinity of the inner semiconductive layer at a semiconductive layer/insulation layer interface,
        a middle part circumferentially covering the inner part, and
        an outer part circumferentially covering the middle part,
    an outer semiconductive layer circumferentially covering the insulation layer and providing an insulation layer/semiconductive layer interface,
    wherein the inner part is located from a first radial distance ($r_0$) at a semiconductive layer/insulation layer interface and has a first thickness, and the inner part is circumferentially covered by a middle part from an initial radial distance ($r_i$) to a maximum radial distance ($r_d$) of the middle part and the middle part has a second thickness, wherein the middle part is circumferentially covered by an outer part from the maximum radial distance ($r_d$) to the outer radial distance ($r_r$), and the outer part has a third thickness, and the second thickness is greater than the first thickness and greater than the third thickness, and
    wherein the laminated polymer material within each one of the parts has a constant thickness and constant thickness ratio of polymer to laminated material, and
    wherein the inner part and outer part have a thickness ratio of polymer to laminated material between 5 and 25%, and wherein the middle part comprises laminated polymer material, wherein the thickness ratio of polymer to laminated material is more than 35%, and
    wherein the three parts have different densities such that a resistivity-governed E-stresses in the inner and outer part of the insulation material are lower compared with the resistivity-governed E-stresses in the middle part of the insulation material.

2. The transmission system according to claim 1, wherein the first thickness of the inner part is in a range of from 2 to 20% of the total thickness of the insulation layer, the second thickness of the middle part is in a range of from 10 to 96% of the total thickness of the insulation layer, and the third thickness of the outer part is in a range of from 2 to 20% of the total thickness of the insulation layer.

3. The transmission system according to claim 1, wherein the total thickness of the insulation layer is between 0.5 and 50 mm.

4. The transmission system according to claim 1, wherein the transmission system is selected from the group consisting of: a cable, a cable joint, bushings, insulated buses, bus bars and cable terminations.

5. The transmission system according to claim 1, wherein the laminated insulation material comprises a plastic material laminated with a paper.

6. The transmission system according to claim 5, wherein the plastic material is selected from the group consisting of: polyolefins including polyethylene, low density polyethylene, medium density polyethylene, high density polyethylene, cross-linked polyethylene, and polypropylene, polyvinyl chloride, polyester, aramid and polyimide, or mixtures thereof.

7. The transmission system according to claim 5, wherein the plastic material is selected as a high density polyethylene.

8. The transmission system according to claim 1, wherein the laminated insulation material comprises a rubber material laminated with a paper.

9. The transmission system according to claim 8, wherein the rubber material is selected from the group consisting of: silicone rubber, ethylene propylene diene monomer rubber and ethylene propylene rubber, or mixtures thereof.

10. The transmission system according to claim 1, wherein the transmission system is impregnated with a gas or liquid.

11. A method for preparing the direct current transmission system comprising, an electrical conductor layer, an inner semiconductive layer circumferentially covering the conductor layer, an insulation layer provided on the outer circumference of the semiconductive layer comprising laminated polymeric material having a thickness and impregnated with a high viscosity fluid, which is solid below 65° C. and including an inner part in the vicinity of the inner semiconductive layer at a semiconductive layer/insulation layer interface, a middle part circumferentially covering the inner part, an outer part circumferentially covering the middle part, and an outer semiconductive layer circumferentially covering the insulation layer, the method comprising the steps of:

providing the conductor layer, circumferentially covered by the semiconductive layer, laminating a plastic or rubber material of the inner part, the middle part and the outer part with paper, winding the obtained laminated material on the inner semiconductive layer, such that firstly the inner part, secondly the middle part and thirdly the outer part is wound on the inner semiconductive layer, wherein the inner part is located from a first radial distance ($r_0$) at a semiconductive layer/insulation layer interface and has a first thickness, and the inner part is circumferentially covered by a middle part from an initial radial distance ($r_i$) to a maximum radial distance ($r_d$) of the middle part and the middle part has a second thickness, wherein the middle part is circumferentially covered by an outer art from the maximum radial distance ($r_d$) to the outer radial distance ($r_r$), and the outer part has a third thickness, and the second thickness is greater than the first thickness and greater than the third thickness, and wherein the laminated polymer material within each one of the parts has a constant thickness and constant thickness ratio of polymer to laminated material, and wherein the inner part and outer part have a thickness ratio of polymer to laminated material between 5 and 25% and wherein the middle part comprises laminated polymer material, wherein the thickness ratio of polymer to laminated material is more than 35%, and wherein the three parts have different densities such that a resistivity-governed E-stresses in the inner and outer part of the insulation material are lower compared with the resistivity-governed E-stresses in the middle part of the insulation material.

12. The method according to claim 11, further comprising the step of impregnating the transmission system with a gas or a liquid, which is solid below 80° C.

13. The method according to claim 12, wherein the liquid is selected from a mineral oil and/or an ester fluid, and the gas is selected from sulfur hexafluoride, compressed air and/or nitrogen.

14. The method according to claim 11 further comprising the step of removing gases from the obtained product.

15. The method according to claim 14 further comprising the step of cross-linking the insulation material.

16. The method according to claim 14 further comprising the step of circumferentially covering the insulation layer with the outer semiconductive layer.

* * * * *